United States Patent
Kaganoi et al.

(10) Patent No.: US 6,513,078 B1
(45) Date of Patent: Jan. 28, 2003

(54) DATA TRANSFER CONTROL APPARATUS, DATA TRANSFER CONTROL SYSTEM AND DATA TRANSFER CONTROL METHOD

(75) Inventors: Teruo Kaganoi, Tokyo (JP); Toshiyuki Kanoh, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/181,167

(22) Filed: Oct. 28, 1998

(30) Foreign Application Priority Data

Nov. 19, 1997 (JP) .............................. 9-317560

(51) Int. Cl.$^7$ .............................. G06F 13/00
(52) U.S. Cl. .................. 710/104; 710/105; 710/107
(58) Field of Search .................. 710/100–105, 710/107–117

(56) References Cited

U.S. PATENT DOCUMENTS

| | | | | |
|---|---|---|---|---|
| 4,633,437 A | * | 12/1986 | Mothersole et al. | 710/74 |
| 4,933,845 A | * | 6/1990 | Hayes | 710/104 |
| 5,423,009 A | | 6/1995 | Zhu | |
| 5,901,332 A | * | 5/1999 | Gephardt et al. | 710/41 |

FOREIGN PATENT DOCUMENTS

| | | |
|---|---|---|
| EP | 0 786 727 A1 | 7/1997 |
| JP | 57-139836 | 8/1982 |
| JP | 63-276155 | 11/1988 |
| JP | 02-42556 | 2/1990 |
| JP | 03-137756 | 6/1991 |
| JP | 03-252847 | 11/1991 |
| JP | 04-225458 | 8/1992 |
| JP | 04-295947 | 10/1992 |
| JP | 5-067055 | 3/1993 |
| JP | 5-1139554 | 5/1993 |
| JP | 05-282242 | 10/1993 |
| JP | 08-153059 | 6/1996 |
| JP | 08/186582 | 7/1996 |
| JP | 09-83539 | 3/1997 |
| JP | 09-102924 | 4/1997 |
| JP | 09-266484 | 10/1997 |
| JP | 09-307553 | 11/1997 |
| JP | 09-319699 | 12/1997 |
| WO | WO 96/41274 | 12/1996 |

* cited by examiner

*Primary Examiner*—Rupal Dharia
(74) *Attorney, Agent, or Firm*—Scully, Scott, Murphy & Presser

(57) ABSTRACT

Data transfer mode between a plurality of circuit mod modules connected to a data bus is dynamically switched between a time division, space-division multiplexing and so forth for improving data transfer efficiency. For example, the data bus of 4n bit width is used as two data bus of 2n bit width in certain period (transfer mode "b"), as one data bus of 4n bit width in a certain period (transfer mode "a"), and further as four data bus of n bit width in a further certain period (transfer mode "c"). A command of switching of the transfer mode is performed by a transfer control circuit common to respective circuit modules. In response to command of the transfer mode, switching of the bit width of data and switching of the bus connecting condition are performed by the bus adapter circuit.

21 Claims, 11 Drawing Sheets

DATA TRANSFER CONTROL APPARATUS, DATA TRANSFER CONTROL SYSTEM AND DATA TRANSFER CONTROL METHOD

BACKGROUND OF THE INVENTION

1. Field of the Invention

The present invention relates generally to a data transfer control apparatus, a data transfer control system and a data transfer control method. More particularly, the invention relates to a data transfer system exchanging data between a plurality of circuit modules using data bus.

2. Description of the Related Art

For increasing data transfer amount in a data transfer system, speeding up and increasing of transfer bit number have been considered. Time division has also been practiced.

In the foregoing method of speeding up and increasing of transfer bit number, there are physical and electrical limits. On the other hand, considering transfer efficiency only by time division, during transferring of certain data, connection is established by point-to-point connection to lower transfer efficiency.

On the other hand, when all circuit modules are connected by point-to-point connection system, amount of wiring becomes huge. Therefore, if connection is established between only certain predetermined circuit modules, a problem is encountered in sacrificing of freedom. As set forth above, the conventional data transfer system employing data bus encounters a problem not adapted for large amount data transfer.

SUMMARY OF THE INVENTION

Therefore, the present invention has been worked out for solving the problem set forth above. It is an object of the present invention to provide a data transfer control apparatus, a data transfer control system and a data transfer control method, which can dynamically switch data transfer modes between respective circuit modules connected through data bus, between a time division and a space division multiplexing for enabling improvement of data transfer efficiency.

According to one aspect of the present invention, a data transfer control apparatus for controlling data transfer between a plurality of circuit modules through data bus comprises control means for controlling variation of a data transfer bit width of the data bus.

According to the second aspect of the present invention, a data transfer control system performing data transfer between a plurality of circuit modules through a data bus having a predetermined bit width, comprises bus bit width variation control means for controlling variation of data transfer bit width of the data bus.

According to the third aspect of the present invention, a data transfer system comprises:

a plurality of circuit modules;
a data bus having N bit width which is an integer greater than or equal to two for transferring data between the circuit modules;
interface means for performing transmission and reception of data between the circuit modules and the data us;
data transfer control means for performing control of transfer of the data bus between the circuit modules, the data transfer control means including switching command means for commanding switching between a transfer de performing data transfer with the N bit width and a data transfer with a bit width of a quotient derived by dividing the integer N by at least one divisor which is other than one;

each of the interface means having switching means for switching control of data bit width of transmission and reception data of the circuit modules depending upon the transfer mode by the switching control means of the data transfer control means.

According to the fourth aspect of the present invention, a data transfer method controlling data transfer between a plurality of circuit modules through a data bus, comprises the step of controlling variation of a data transfer bit width of the data bus.

In the operation of the present invention, assuming he bit width of the data bus connecting a plurality of circuit modules is taken as 4n (n is natural number) bits, for example, the bit width is controlled to selectively switch between a transfer mode to use data bus as one data bus of 4n bit width, a transfer mode to use the data bus as two data bus of 2n bit width, and a transfer mode to use the data bus as four data bus of n bit width, to achieve the foregoing object.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 1:
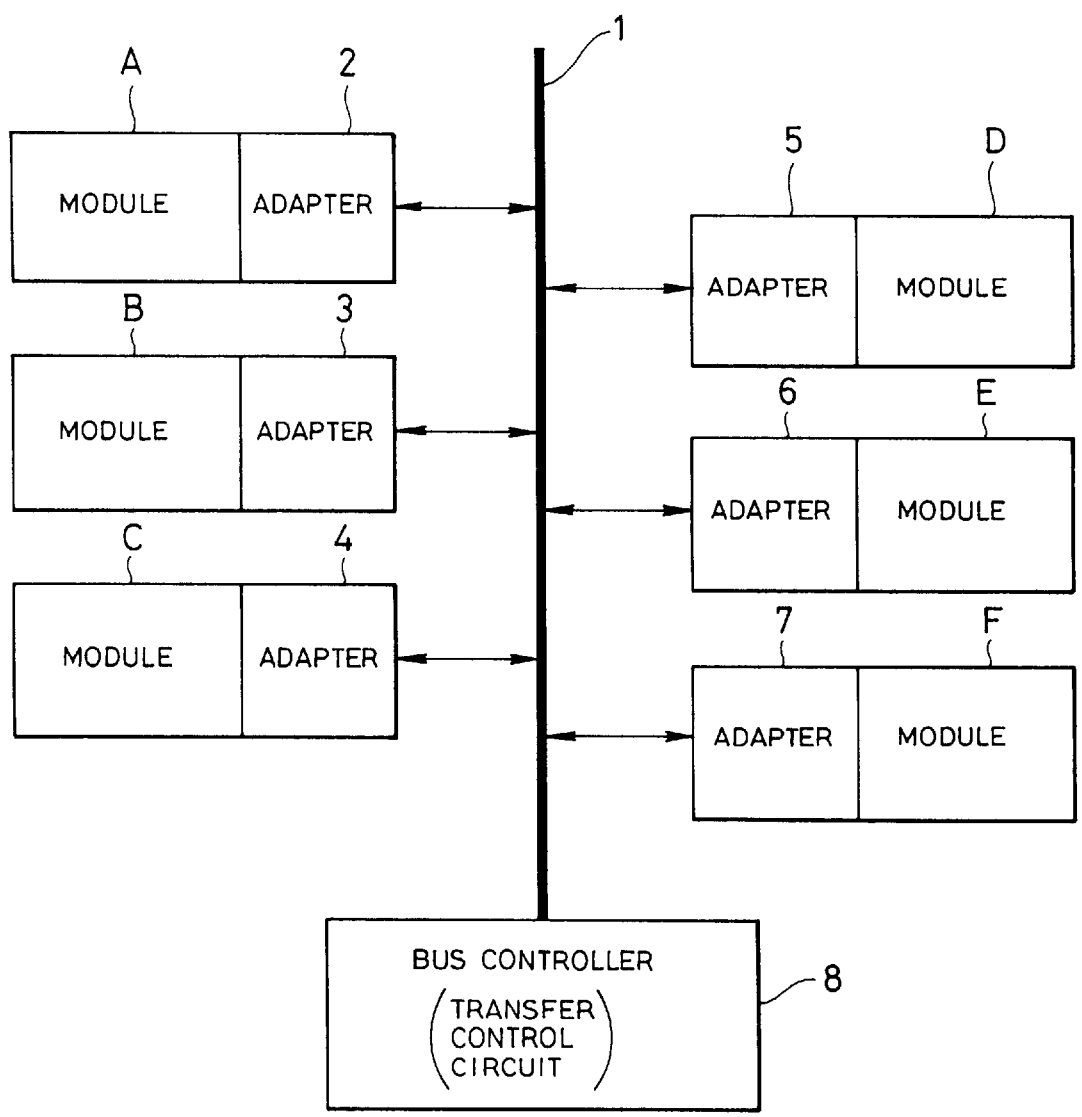
FIG. 1 is a schematic block diagram showing a preferred construction of a system according to the present invention.

FIG. 1 is a schematic block diagram showing the preferred construction of a transfer control system according to the present invention. Referring to FIG. 1, a plurality of circuit modules A to F are mutually connected to one data bus 1 via adapter circuits (interface means) 2 to 7. By a bus controller (transfer control circuit) 8, data transfer control of the bus is performed. A bus width of the data bus 1 is assumed to be 4n bits, where n is a natural number.

In the conventional data transfer system, a transmitting side and a receiving side are switched in time division to multiplex in time to perform data transfer. On the other hand between the transmitting side and the receiving side, point-to-point connection is performed to data transfer with spacial multiplexing.

With respect to this, in the present invention, the adapter circuits 2 to 7 are provided between respective circuit modules A to F and the bus 1 to perform switching control of transfer modes of the bus in time division manner. At this time, as shown in FIGS. 2A and 2B, the transfer mode of the bus 1 is controlled to be selectively switched between a mode "a" in certain period, a transfer mode "b" in another period and a transfer mode "c" in a further period. The transfer mode "a" is a mode in which the data bus 1 is used as one data bus of 4n bit width. The transfer mode "b" is a mode in which the data bus 1 is used as two data buses of 2n bit width. The transfer mode "c" is a mode in which the data bus is used as four data buses of n bit width.

Switching of the connecting position and absorption of band difference of transfer data to be caused by switching the transfer mode of the bus are performed by respective adapters 2 to 7.

Concerning command for switching of transfer mode, in the bus controller 8, a table designating transfer modes is provided. It is possible to fixedly (periodically and sequential selectively) perform a switching command control on the basis of information of the table. Also, it is possible to generate a transfer demand from destination of various connections (circuit module) to perform scheduling to perform switching command control. Furthermore, it is possible to appropriately perform switching control of transfer mode depending upon convergence condition of the bus 1.

Figure 3:
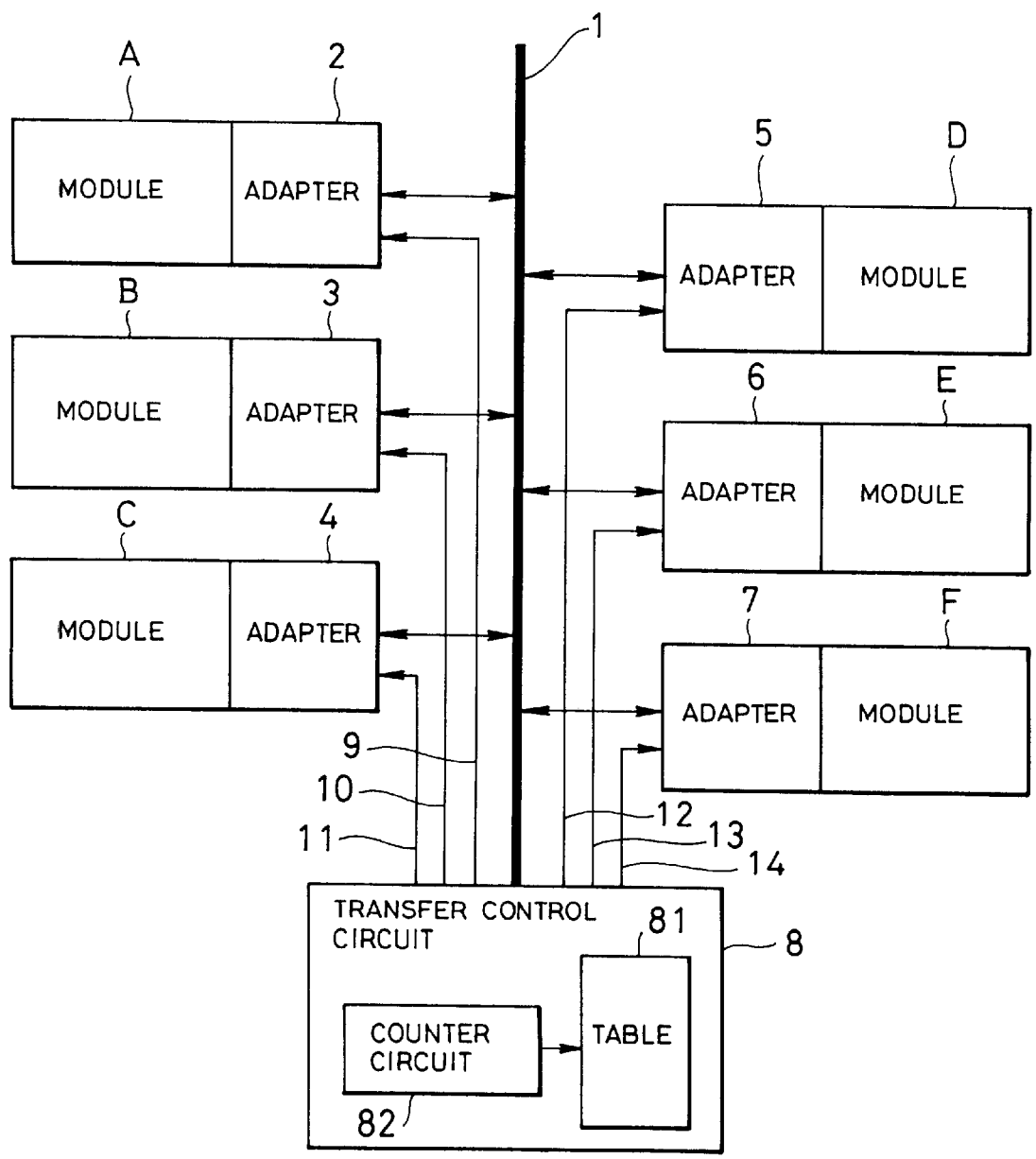
FIG. 3 is a block diagram showing one embodiment a system according to the present invention.

FIG. 3 is a block diagram of one embodiment of the present invention. Like components to those in FIG. 1 will be identified by like reference numerals. Referring to FIG. 3, a plurality of circuit modules A to F are mutually connected by the data bus 1 via the adapter circuits 2 to 7. By the transfer control circuit 8 serving as the bus controller, control of switching command of the transfer bit width of the data bus 1 is performed.

The transfer control circuit 8 includes a transfer mode designation table (scheduling table) 81 preliminarily defining transfer modes and a counter circuit 82 generating a transfer mode switching control signal for reading contents of this table 81. The counter circuit 82 performs count up by counting a predetermined cyclic timing signal. According to the content of count, the transfer mode set in the table 81 is sequentially and selectively read out. The read out transfer mode is noticed to respective adapter circuits 2 to 7 respectively via control signal lines 9 to 14.

Figure 12:
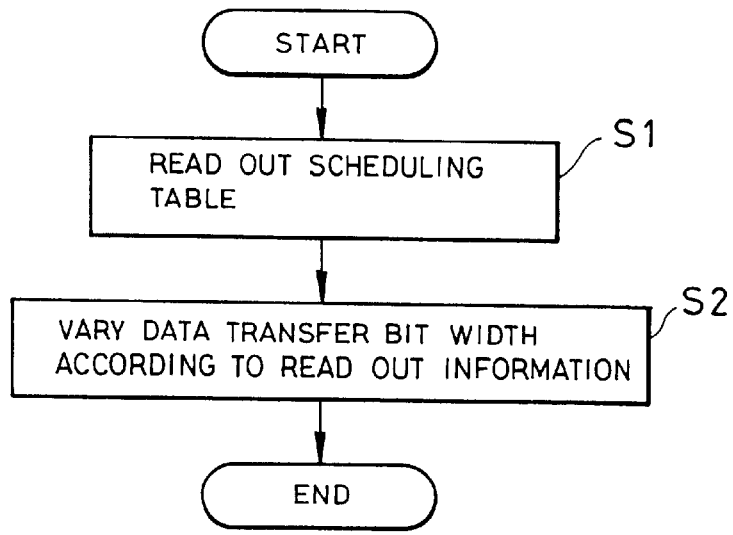
FIG. 12 is a flowchart showing one embodiment of operation of the transfer control circuit according to the present invention.

In this case, the transfer control circuit 8 performs process according to the flowchart of FIG. 12. Reading out of the scheduling table is read out (step S1). According to the information read out, a transfer mode is determined (step S2).

Figure 4:
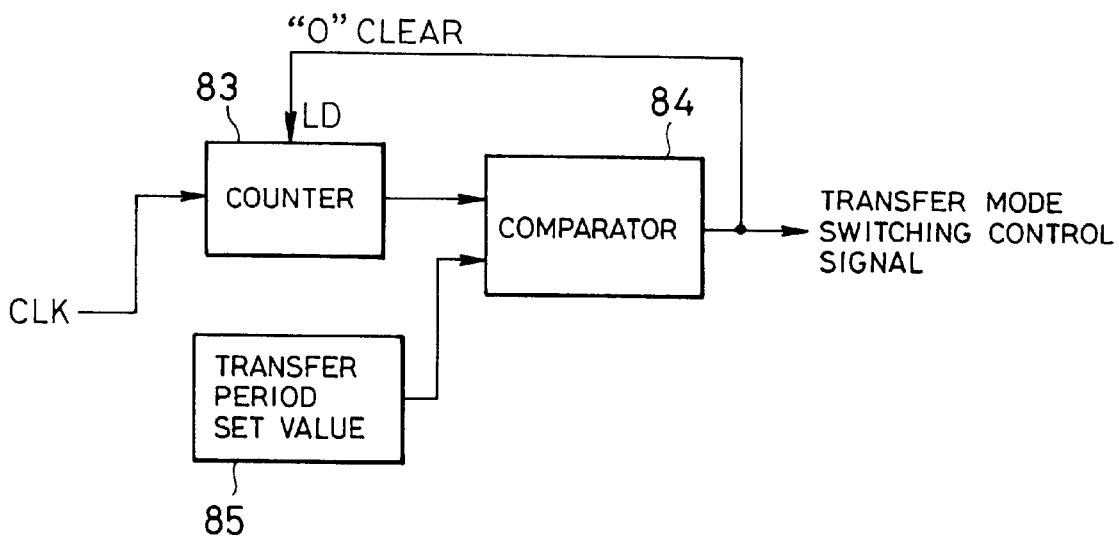
FIG. 4 is an illustration showing a particular embodiment of a counter circuit of a transfer control circuit 8 in one embodiment of the present invention.
Figure 5:
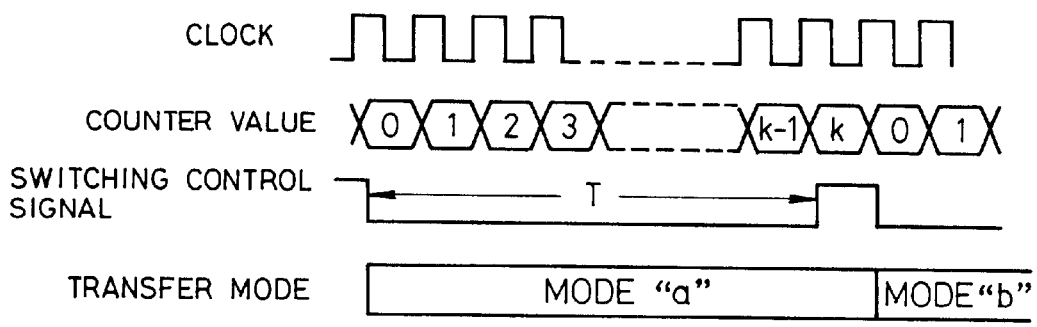
FIG. 5 is a timing chart showing an operation of the circuit shown in FIG. 4.

FIG. 4 shows a detailed construction of the counter circuit 82, and FIG. 5 shows an operational timing chart. In these drawings, a counter 83 counts up a clock signal CLK. The content of count is compared with a transfer period set value 85 by a comparator 84. When both of the content of count and the transfer period set value 85 become equal, a transfer mode switching control signal is generated from the comparator 84 and a signal for commanding new transfer mode is read out from the table 81 to be output. In FIG. 5, there is shown an example of the case of switching from the transfer mode "a" to the transfer mode "b".

It should be noted that the counter 83 is reset in response to generation of the transfer mode switching control signal from the comparator 84 to clear the content to return to the initial state. The counting clock CLK of the counter 83 is set as a signal synchronized with bits of the transfer data in the data bus 1, and a period T of the switching control signal, namely switching period of the transfer modes is arbitrary selected to eight periods, sixteen periods, thirty-two periods and so forth of the clock signal CLK, for example.

Respective circuit modules A to F are assumed to be different in total amount of data to be transferred or transfer rate. In other words, an input/output bit width, a data transfer frequency, continuing time suitable for respective circuit modules A to F are differentiated. For transferring these different kinds of data through a single bus 1, the adapter circuits 2 to 7 are provided for performing accumulation of data, conversion of bit width and extraction of transmission timing.

Figure 6:
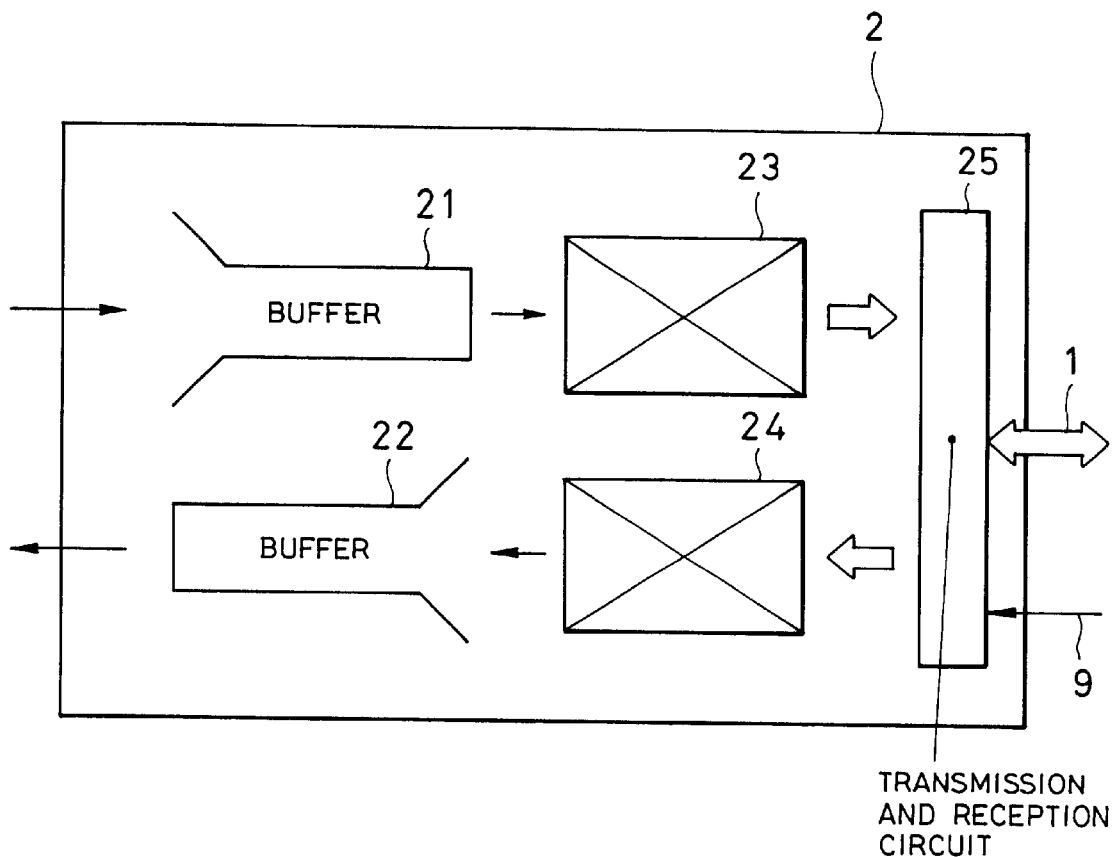
FIG. 6 is an illustration showing one embodiment of an adapter in one embodiment of the present invention.

FIG. 6 is a block diagram of the adapter circuit. The adapter circuit includes a buffer circuit 21 for accumulating a transmission data, a buffer circuit 22 for accumulating a reception data, a switch circuit 23 for converting a bit width of the transmission data, a switch circuit 24 for converting a bit width of the reception data and a transmission and reception circuit 25 extracting a transmission and reception timing and actually performing transmission/reception of data. Assuming that the data width of the bus 1 is 4n bit width as set forth above, respective adapter circuits 2 to 7 are all connected in 4n bit width.

Figure 2:
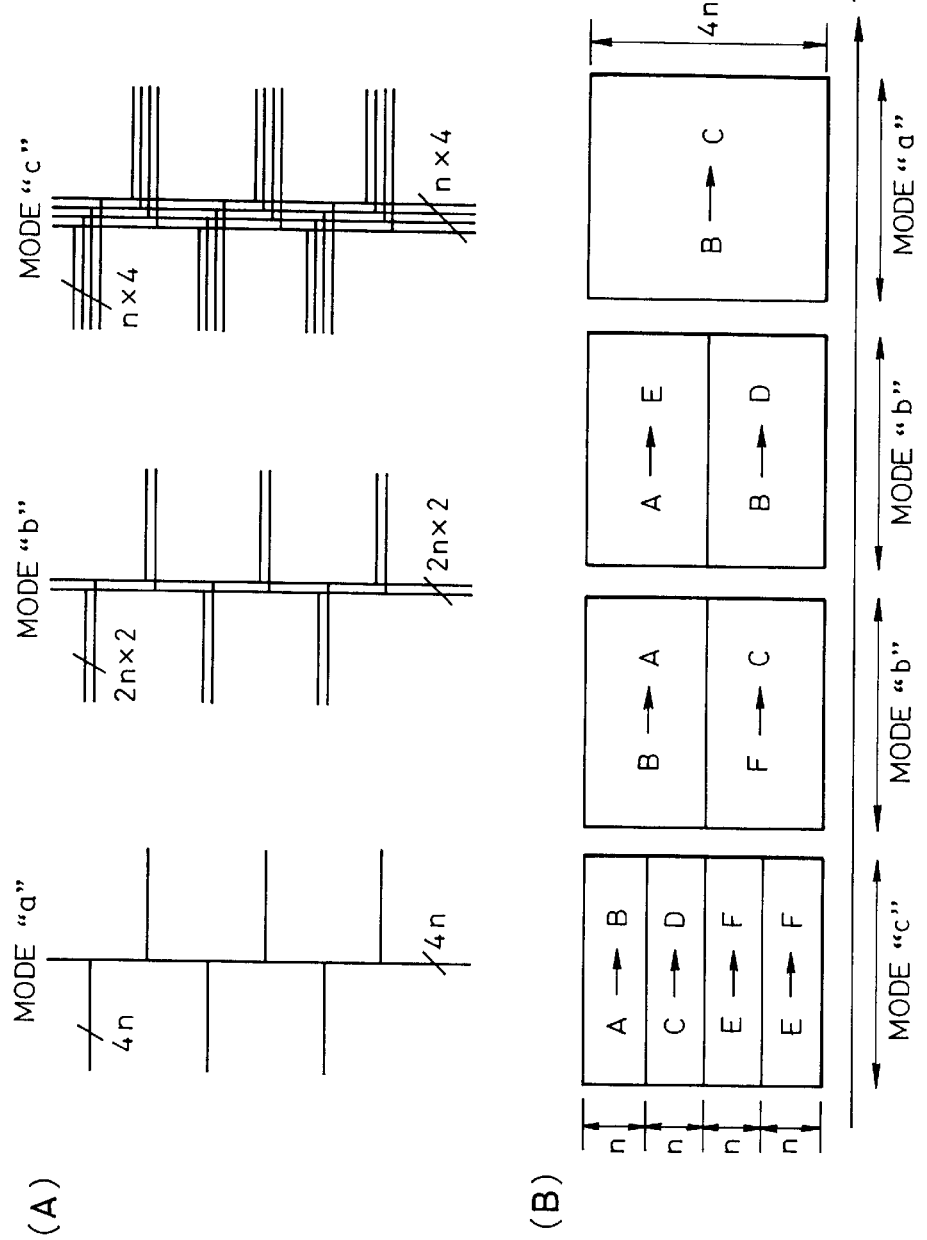
FIG. 2A is an diagrammatic illustration showing manners of connection of data bus in various transfer modes.
FIG. 2B is an illustration showing examples of data transfer in various transfer modes.

In the construction set forth above, the operation of the shown embodiment will be discussed. As an example of the transfer mode, here, there are three kinds of transfer modes as shown in FIG. 2. Namely, as the mode "a", the data bus is used as one bus of the 4n bit width, as the mode "b", data bus is used as two buses of the 2n bit width, and as the mode "c", the data bus is used as four buses of n bit width. Thus, the data bus is used in three kinds of transfer modes. Switching of these transfer modes is performed every given period (hereinafter referred to as transfer period time).

Figure 7:
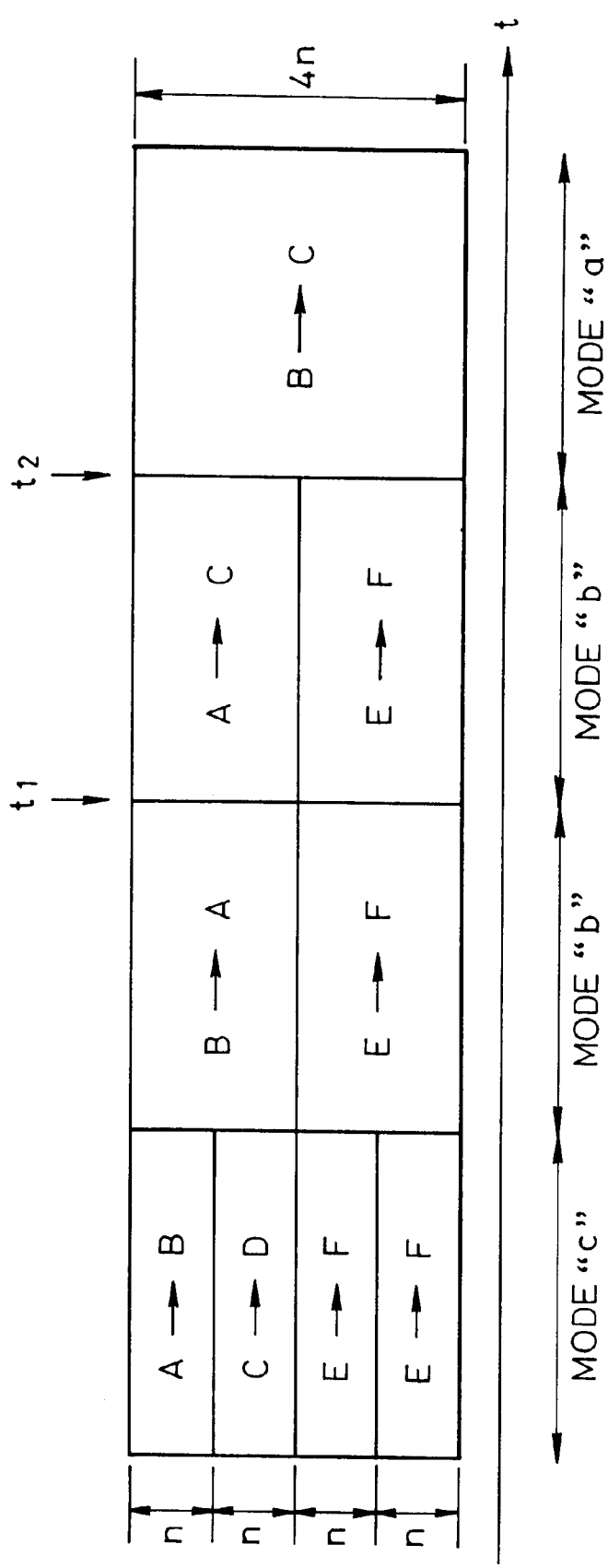
FIG. 7 is an illustration explaining operation of one embodiment of the present invention, showing an example of data transfer in various transfer modes.

For example, at a timing t1 of FIG. 7, the counter circuit 82 is cleared. From this timing t1, data transfer is initiated under the transfer mode "b". When the counter circuit 8 generates the next switching control signal, the content of the table 81 is newly read out at a timing t2. Then, switching to new transfer mode "a" is commanded. Subsequently, the same operation as set forth above is repeated.

In respective adapter circuits 2 to 7, transmission and reception of data is performed according to the transfer mode commanded from the transfer control circuit 8. At this time, data is supplied from respective circuit modules A to F is sequentially accumulated to the buffer circuit 21. According to command of transfer mode of the transfer control circuit 8, the switch circuit 23 reads out data from the buffer circuit 21. Data of the allowed bit width is switched to the allowed bit position for transmitting the output data bus 1 during the transfer period time.

It is similar to the case of receiving data. According to command of the transfer mode supplied from the transfer control circuit 8, upon receiving data, the input bit position and the bit width of data is switched by the switch circuit 24 for inputting to the buffer circuit 22 to supply the buffer circuit 22. The input data is respectively output to respective circuit modules A to F. According to the command of the transfer control circuit 8, similar operation is repeated subsequently.

Here, by setting that switch circuits 23 and 24 will never perform transmission and reception at the same timing, a single switch circuit may be used in common.

Figure 8:
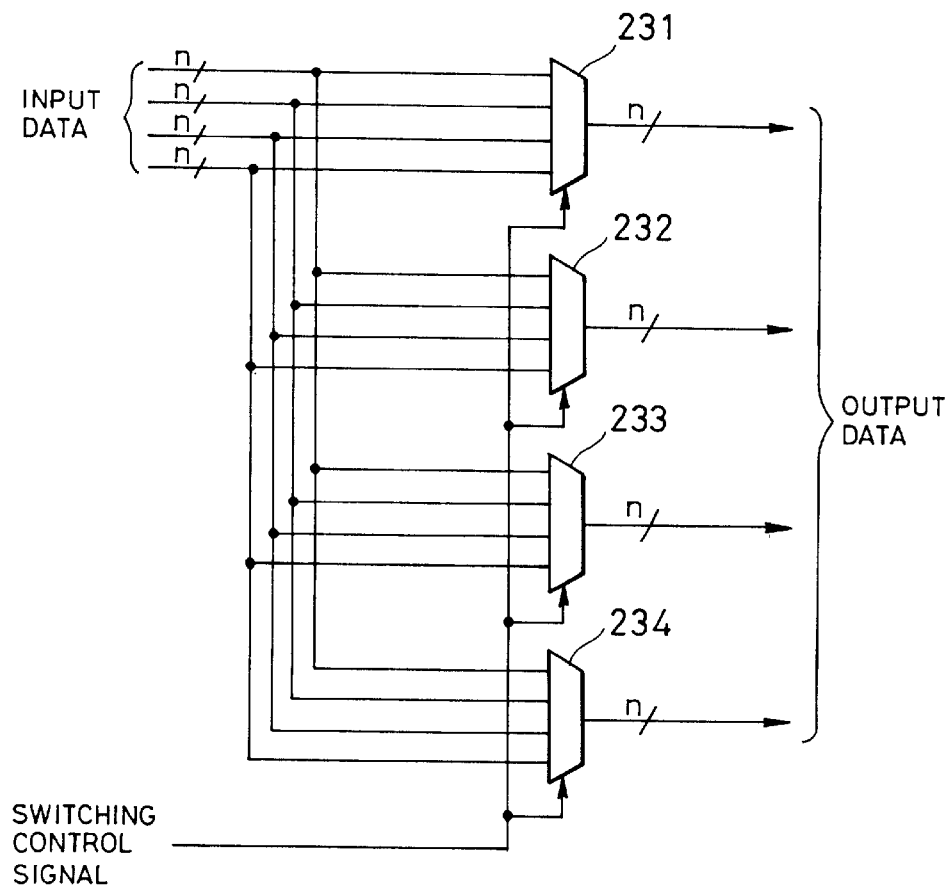
FIG. 8 is an illustration showing one embodiment of a switch circuit in the adapter in one embodiment of the system according to the present invention.

FIG. 8 is an illustration showing one embodiment of the switch circuit 23 of FIG. 6, and shows an example in the case where the bus width is 4n bits. Four sets of signal lines, each set of which is consisted of n bit of signal lines on the input side, are respectively supplied to respective inputs of four 4/1 selectors 231 to 234. According to switching control signal, one set of signal lines are selected to lead to one of the four sets of signal lines (on the output side: on the bus), each of which is consisted of n bit of signal lines. Variation control of the data width and variation control of the output lines of respective bits of data become possible.

Figure 9:
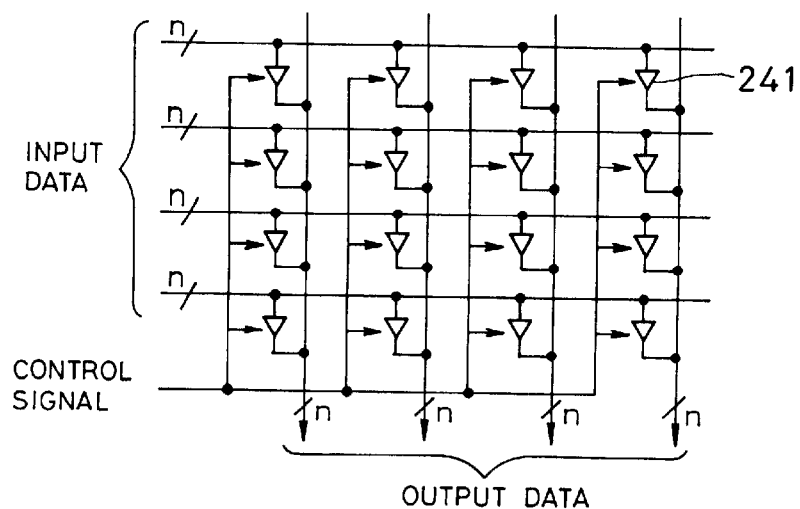
FIG. 9 is an illustration showing another embodiment of a switch circuit in the adapter in one embodiment of the system according to the present invention.

On the other hand, FIG. 9 is an illustration showing another embodiment of the switch circuit 23 of FIG. 6. The four sets of signal lines, each set of which is consisted of n bits of signal lines on the input side and the four sets of the signal lines, each set of which is consisted of n bits of signal lines on the output side are taken as row lines and column lines to be arranged in matrix fashion. At each intersecting point of the row line and the column line, a switching element 241 is arranged. By appropriately controlling ON and OFF of each switching element with the control signal, variation control of the data width and variation control of the output lines of respective bits becomes possible.

It is clear that the switch circuit 24 of FIG. 6 can be constructed similarly as the construction shown in FIGS. 8 and 9.

Figure 10:
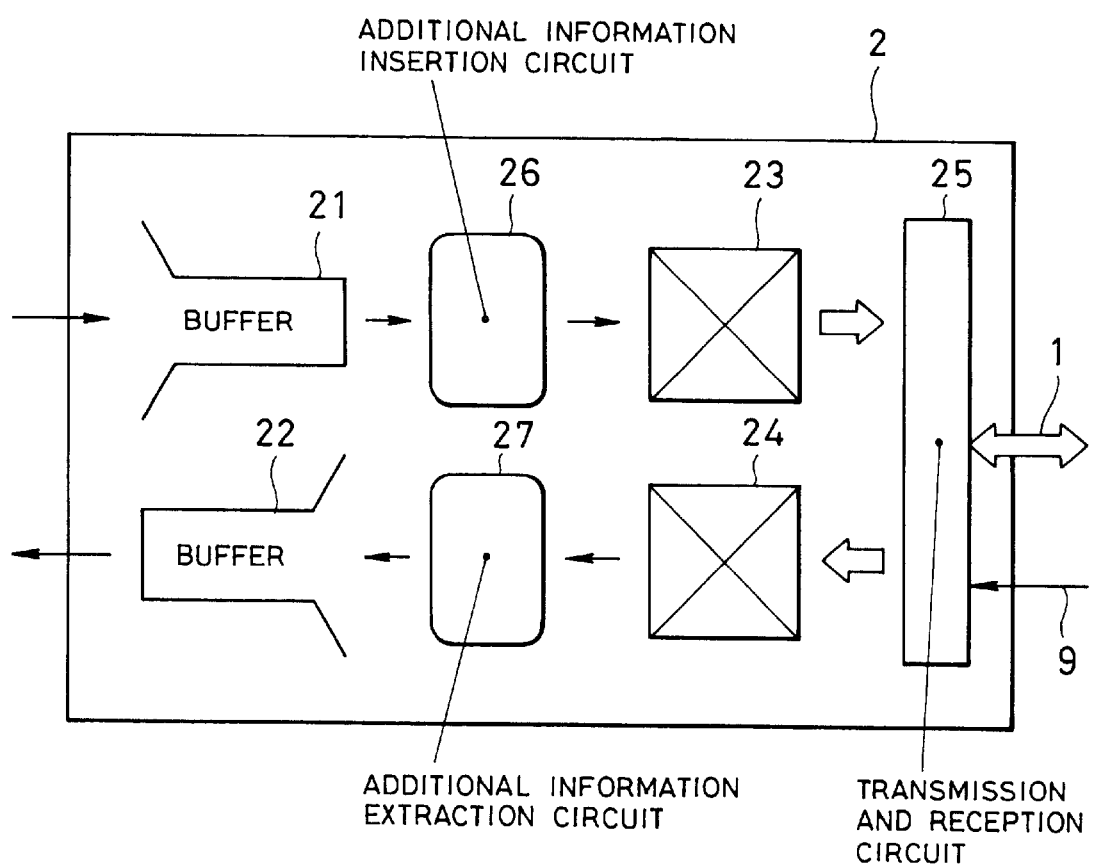
FIG. 10 is an illustration showing another embodiment of an adapter in one embodiment of the present invention.

FIG. 10 is a block diagram showing another embodiment of the adapter circuits 2 to 7. Like components to those in FIG. 6 will be identified by like reference numerals. In FIG. 10, discussion will be given only for the components different from FIG. 6. Between the buffer circuit 21 and the transmission and reception circuit 25, an additional information insertion circuit 26 is provided for adding an address information. On the other hand, between the buffer circuit 22 and the transmission and reception circuit 25, an additional information extraction circuit 27 is provided for extracting the address information.

The additional information insertion circuit 26 has a function for inserting the address information to a predetermined position, such as the leading end, upon transmission of data. In this case, the transmission data is supplied to the adapter circuits 2 to 7 of all circuit modules A to F. On the other hand, the additional information extraction circuit 27 extracts the address information per transfer period. When the data is addressed to the own system, the additional information extraction circuit 27 outputs data to the buffer circuit 22 in the next stage. If the data is not addressed to own system, the additional information extraction circuit 27 abandons the data.

Thus, in the transfer control circuit 8, it is only required to perform scheduling of the transmitting side and is unnecessary to control the receiving side. However, in this case, it becomes impossible to perform data transfer from a plurality of the circuit modules to one circuit module.

Figure 11:
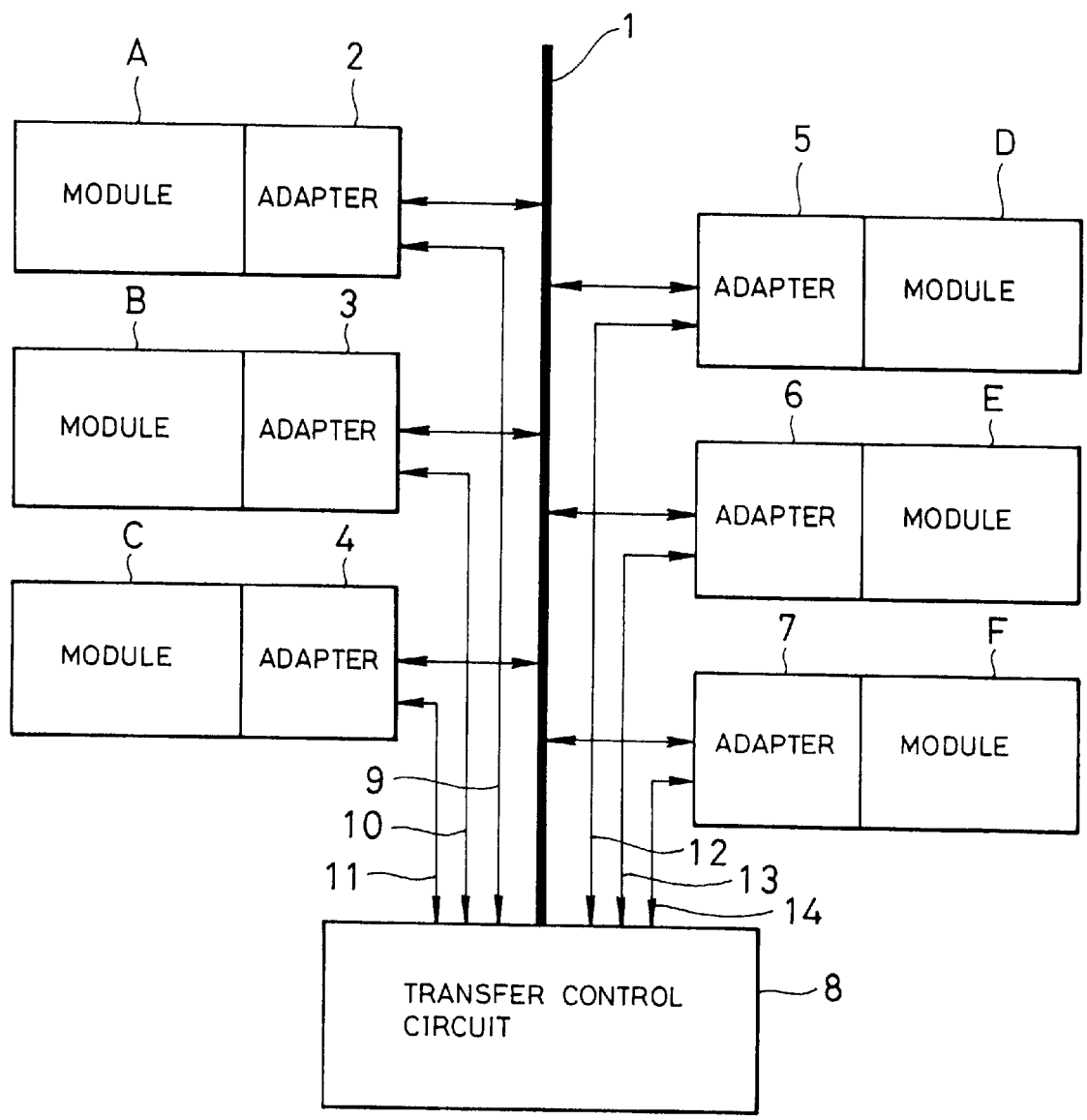
FIG. 11 is a block diagram showing another embodiment of the system according to the present invention.
Figure 13:
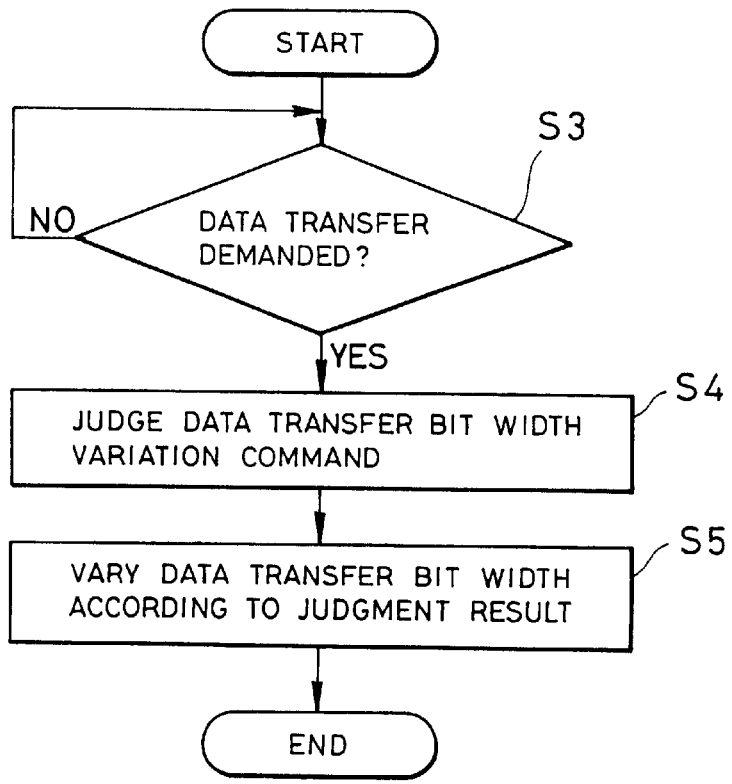
FIG. 13 is a flowchart showing another embodiment of operation of the transfer control circuit according to the present invention.

FIG. 11 is a block diagram showing another embodiment of the system according to the present invention. Like components to those in FIGS. 1 and 3 will be identified by like reference numerals. In FIG. 11, the transfer demands from respective adapters 2 to 7 are respectively input to the transfer control circuit 8 via the control signal lines 9 to 14. The transfer control circuit 8 performs process according to a flowchart of FIG. 13. In response to a transfer demand from respective adapters 2 to 7 (step S3), the transfer mode included in this demand (variation command of the data transfer bit width) is judged (step S4). On the basis of the result of judgment, the transfer mode is determined when the transfer period is reached (step S5). For respective of the adapter circuits 2 to 7, the transfer mode is noticed through respective control signal lines 9 to 14.

In this case, the transfer control table (81 of FIG. 31) is not necessary in the transfer control circuit 8. It becomes possible to flexibly switch the transfer mode depending upon the transfer demand of respective circuit modules A to F.

It should be noted that the data bus is constructed to have 4n bit width, and the transfer mode is selected among four kinds of transfer modes including one data bus of 4n bit width, two data buses of 2n bit width and four data buses of n bit width in the embodiments set forth above. However, in general, the data bus is formed with N bit width (N is integer greater than or equal to two), and in addition to the case where the N bit width is used as one data bus, the data bus can be used as plurality of data buses of the number corresponding to divisor with each divided data bus having bit width of the quotient derived by dividing N bit width by the divisor (excluding one).

Figure 14:
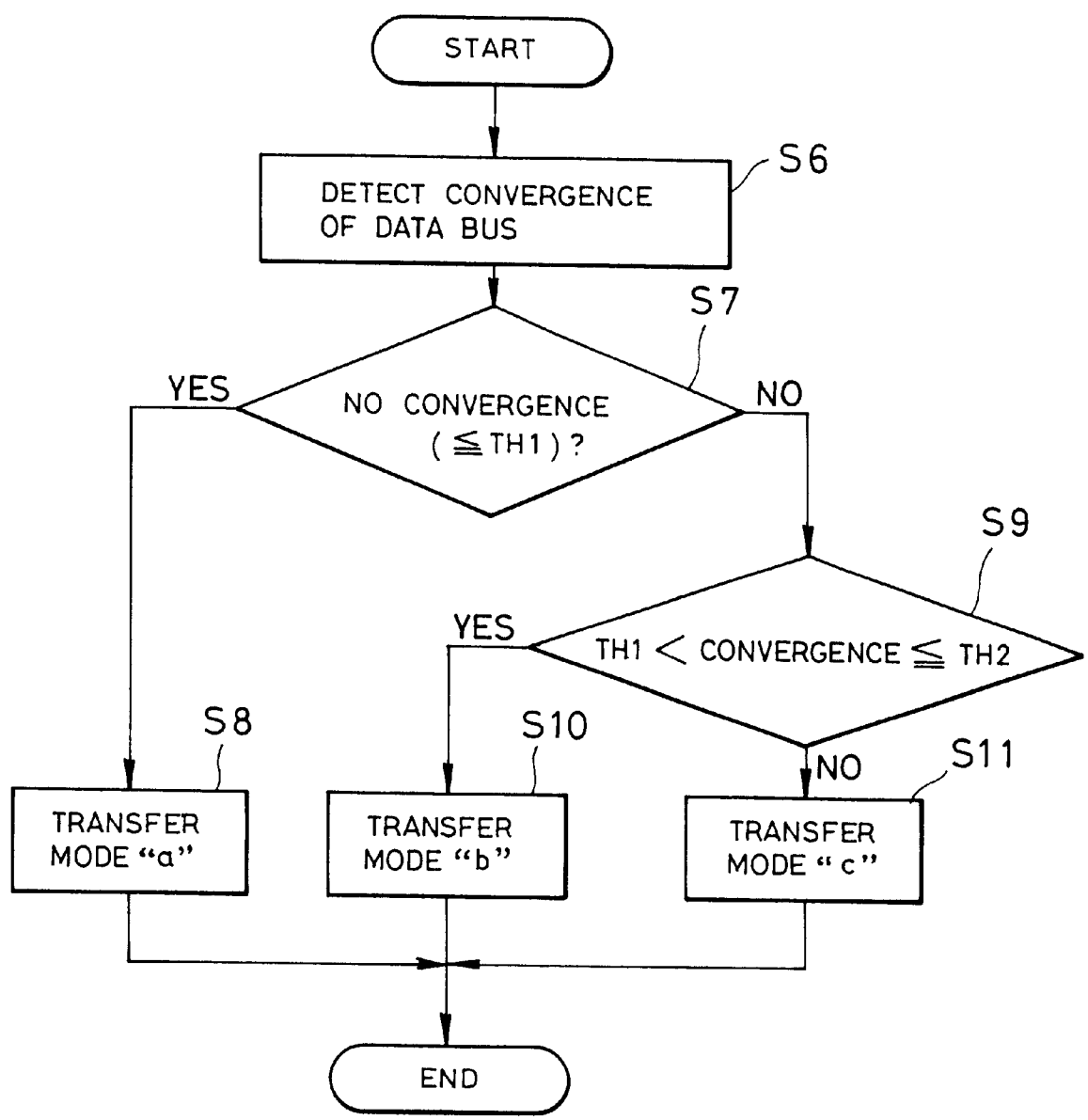
FIG. 14 is a flowchart showing a further embodiment of operation of the transfer control circuit according to the present invention.

In the shown embodiment, discussion has been given for variation control of the transfer mode by the scheduling table in the transfer control circuit or by control in response to the demand from respective modules, it is also considered to perform control depending upon convergence condition of the data bus. In this case, the transfer control circuit 8 is operated according to the flowchart shown in FIG. 14. By providing a convergence detecting function for detecting convergence condition (step S6), in the normal state, the data bus is used with 4n bit width of the transfer mode "a" (steps S7 and S8). When the transfer data is crowed exceeding a first threshold value TH1, the data bus is used as two data buses with 2n bit width in the transfer mode "b" (steps S9 and S10). When the transfer data becomes further crowed to exceed a second threshold value TH2, the data bus is used as four data buses with n bit width in the transfer mode "c" (step S11).

The present invention is used for a router in an internet, or for data processing portion in an ATM (asynchronous transfer mode) communication network, a SDH (synchronous digital hierarchy) communication net work and so forth. A constructions of FIGS. 1, 3 and 11 are normally integrated as one-chip LSI including the data bus 1. In this case, as respective circuit modules A to F, for example, one circuit module is CPU which forms core of data processing, and other circuit modules are hardware according to command of the CPU.

As set forth above, according to the present invention, since the data transfer mode between respective circuit modules connected to the data bus can be dynamically switched between time division and space-division multiplexing, it becomes possible to efficiently use the transmission band to improve transfer efficiency. On the other hand, the adapter circuit is provided between each circuit module and the data bus to enable connection with one data bus with absorbing difference of data transfer (e.g. bit width, transfer amount, transfer rate and so forth) per each of individual circuit modules.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A data transfer control apparatus for controlling data transfer between a plurality of circuit modules through a data bus comprising a data transfer controller for controlling a data transfer bit width of said data bus and a plurality of circuit module interfaces for performing transmission and reception of data between said circuit modules and said data bus;

wherein each interface includes a switch for switching control of said data transfer bit width of transmission and reception data depending upon a transfer mode of said data transfer controller.

2. A data transfer control apparatus as set forth in claim 1, wherein said data transfer controller performs control of said data transfer bit width by reading out information of a predetermined scheduling table per a predetermined period and according to the read out information.

3. A data transfer control apparatus as set forth in claim 2, wherein said data transfer controller comprises a counter counting a given period of clock pulses and a reader for reading out information of said scheduling table sequentially per said predetermined period.

4. A data transfer control apparatus as set forth in claim 1, wherein said data transfer controller performs control of said data transfer bit width depending upon a demand from said circuit module.

5. A data transfer control apparatus as set forth in claim 1, wherein said data transfer controller performs control of said data transfer bit width depending upon a convergence condition of said data bus.

6. A data transfer control apparatus as set forth in claim 1, wherein said data bus has a bit width of N which is an integer greater than or equal to two, said data transfer controller performs control of said data transfer bit width by switching control between a transfer mode performing data transfer of N bit width and a transfer mode performing data transfer of a bit width corresponding to a quotient derived by dividing N with at least one divisor which is other than one.

7. A data transfer control system performing data transfer between a plurality of circuit modules through a data bus having a predetermined bit width, comprising a bus bit width controller for controlling a data transfer bit width of said data bus and a plurality of circuit module interfaces for performing transmission and reception of data between said circuit modules and said data bus;

wherein each interface includes a switch for switching control of said data transfer bit width of transmission and reception data depending upon a transfer mode of said bus bit width controller.

8. A data transfer control system as set forth in claim 7, wherein said bus bit width controller performs control of said data transfer bit width by reading out information of a predetermined scheduling table per a predetermined period and according to the read out information.

9. A data transfer control system as set forth in claim 7, wherein said bus bit width controller performs control of said data transfer bit width depending upon a demand from said circuit module.

10. A data transfer control system as set forth in claim 7, wherein said bus bit width controller performs control of said data transfer bit width depending upon a convergence condition of said data bus.

11. A data transfer control system as set forth in claim 7, wherein said data bus has a bit width of N which is an integer greater than or equal to two, said bus bit width controller performs control of said data transfer bit width by switching control between a transfer mode performing data transfer of N bit width and a transfer mode performing data transfer of a bit width corresponding to a quotient derived by dividing N with at least one divisor which is other than one.

12. A data transfer system comprising:

a plurality of circuit modules;

a data bus having N bit width where N is an integer greater than or equal to two for transferring data between said circuit modules;

an interface for performing transmission and reception of data between said circuit modules and said data bus;

a data transfer controller for performing control of data transfer on said data bus between said circuit modules, said data transfer controller comprising a first switch for switching between a transfer mode performing data transfer with said N bit width and a data transfer with a bit width of a quotient derived by dividing said integer N by at least one divisor which is other than one;

each of said interfaces comprising a second switch for switching control of a data bit width of transmission and reception data of said circuit modules depending upon the transfer mode of said first switch of said data transfer controller.

13. A data transfer system as set forth in claim 12, wherein said first switch selectively commands said transfer mode at a predetermined period.

14. A data transfer system as set forth in claim 12, wherein said first switch comprises a scheduling table for setting said transfer modes and a reader for sequentially reading out the content of said scheduling table at a predetermined period.

15. A data transfer system as set forth in claim 14, wherein said reader includes a counter for counting a timing pulse of a constant period, and the content of said scheduling table is read out according to the content of a count.

16. A data transfer system as set forth in claim 12, wherein said first switch determines the transfer mode in response to a transfer demand from each interface to command each of said interfaces.

17. A data transfer system as set forth in claim 12, wherein each interface comprises an address for adding address information for a transmission data and an address extractor for extracting said address information from a reception data, said reception data is obtained only when said extracted address is that of its own system.

18. A data transfer method controlling data transfer between a plurality of circuit modules through a data bus and a plurality of circuit module interfaces for performing transmission and reception of data between said circuit modules and said data bus, wherein each interface includes a switch for switching control of a data transfer bit width of transmission and reception data depending upon a transfer mode of a data transfer controller, comprising the step of controlling a data transfer bit width of said data bus.

19. A data transfer method as set forth in claim 18, which further comprises the steps of reading information of predetermined scheduling table and varying said data transfer bit width according to the read out information.

20. A data transfer method as set forth in claim 18, which comprises the step of varying said data transfer bit width according to command information in response to information commanding a change in data transfer bit width to accommodate a data transfer from one or more of said plurality of circuit modules.

21. A data transfer method as set forth in claim 18, which comprises the steps of detecting a convergence condition of said data bus and varying said data transfer bit width depending upon said convergence condition.

\* \* \* \* \*